US012577166B2

(12) United States Patent
Lyu

(10) Patent No.: US 12,577,166 B2
(45) Date of Patent: Mar. 17, 2026

(54) MANGANESE-ZINC FERRITE WITH HIGH MAGNETIC PERMEABILITY AT NEGATIVE TEMPERATURE AND LOW LOSS AT HIGH TEMPERATURE AND METHOD FOR PREPARING SAME

(71) Applicant: HENGDIAN GROUP DMEGC MAGNETICS CO., LTD., Dongyang (CN)

(72) Inventor: Donghua Lyu, Dongyang (CN)

(73) Assignee: HENGDIAN GROUP DMEGC MAGNETICS CO., LTD., Dongyang (CN)

( * ) Notice: Subject to any disclaimer, the term of this patent is extended or adjusted under 35 U.S.C. 154(b) by 838 days.

(21) Appl. No.: 17/793,418

(22) PCT Filed: Jul. 15, 2020

(86) PCT No.: PCT/CN2020/101986

§ 371 (c)(1),
(2) Date: Jul. 18, 2022

(87) PCT Pub. No.: WO2021/164191

PCT Pub. Date: Aug. 26, 2021

(65) Prior Publication Data

US 2023/0042168 A1 Feb. 9, 2023

(30) Foreign Application Priority Data

Feb. 19, 2020 (CN) .......................... 202010101797.X

(51) Int. Cl.
| | |
|---|---|
| *C04B 35/26* | (2006.01) |
| *C04B 35/626* | (2006.01) |
| *C04B 35/63* | (2006.01) |
| *C04B 35/634* | (2006.01) |
| *C04B 35/64* | (2006.01) |
| *H01F 1/34* | (2006.01) |

(52) U.S. Cl.
CPC ...... *C04B 35/2658* (2013.01); *C04B 35/6262* (2013.01); *C04B 35/6264* (2013.01); *C04B 35/62655* (2013.01); *C04B 35/62695* (2013.01); *C04B 35/6303* (2013.01); *C04B 35/63416* (2013.01); *C04B 35/64* (2013.01); *H01F 1/344* (2013.01); *C04B 2235/3208* (2013.01); *C04B 2235/3244* (2013.01); *C04B 2235/3262* (2013.01); *C04B 2235/3272* (2013.01); *C04B 2235/3274* (2013.01); *C04B 2235/3275* (2013.01); *C04B 2235/3284* (2013.01); *C04B 2235/3293* (2013.01); *C04B 2235/602* (2013.01); *C04B 2235/661* (2013.01)

(58) Field of Classification Search
CPC . H10F 1/344; C09K 35/2658; C09K 35/6262; C09K 35/62655; C09K 35/6303; C09K 35/63416; C09K 35/64; C09K 2235/3244; C09K 2235/3274; C09K 2235/3273; C09K 2235/3275; C09K 2235/3293; C09K 2235/661; C09K 2235/602; C09K 2235/3208; C09K 2235/3263; C09K 2235/3284

See application file for complete search history.

(56) References Cited

FOREIGN PATENT DOCUMENTS

| | | | |
|---|---|---|---|
| CN | 101996727 | A | 3/2011 |
| CN | 102693802 | * | 9/2012 |
| CN | 102693802 | A | 9/2012 |
| CN | 103588472 | * | 2/2014 |
| CN | 103588472 | A | 2/2014 |
| CN | 104591711 | * | 5/2015 |
| CN | 104591711 | A | 5/2015 |
| CN | 107459344 | A | 12/2017 |
| CN | 108821760 | A | 11/2018 |
| CN | 109354489 | A | 2/2019 |
| CN | 109851346 | A | 6/2019 |
| CN | 111362685 | A | 7/2020 |
| IN | 103708818 | A | 4/2014 |
| JP | 2019199379 | A | 11/2019 |
| WO | WO 2010/087514 | * | 8/2010 |

OTHER PUBLICATIONS

Translation for CN 102693802, Sep. 26, 2012.*
Translation for CN 103588472, Feb. 29, 2014.*
Translation for CN 104591711, May 6, 2015.*

* cited by examiner

*Primary Examiner* — C Melissa Koslow
(74) *Attorney, Agent, or Firm* — Bayramoglu Law Offices LLC

(57) ABSTRACT

A manganese-zinc ferrite with a high magnetic permeability at negative temperature and low loss at high temperature consists of $Fe_2O_3$, MnO and ZnO, and additives consisting of $CaCO_3$, $ZrO_2$, $Co_2O_3$ and $SnO_2$ are also added. A method for preparing the manganese-zinc ferrite is further provided. According to the method, by reasonably adjusting a ratio of Mn to Zn to Fe and appropriately increasing the content of Co in the additives, a manganese-zinc ferrite material with both a high magnetic permeability and low loss at about −20° C. and low loss at 120-140° C. is obtained. The manganese-zinc ferrite material has two loss valleys at about −20° C. and about 100° C. in a temperature range of −30° C. to 140° C., which expands the application range of the manganese-zinc ferrite material.

9 Claims, 1 Drawing Sheet

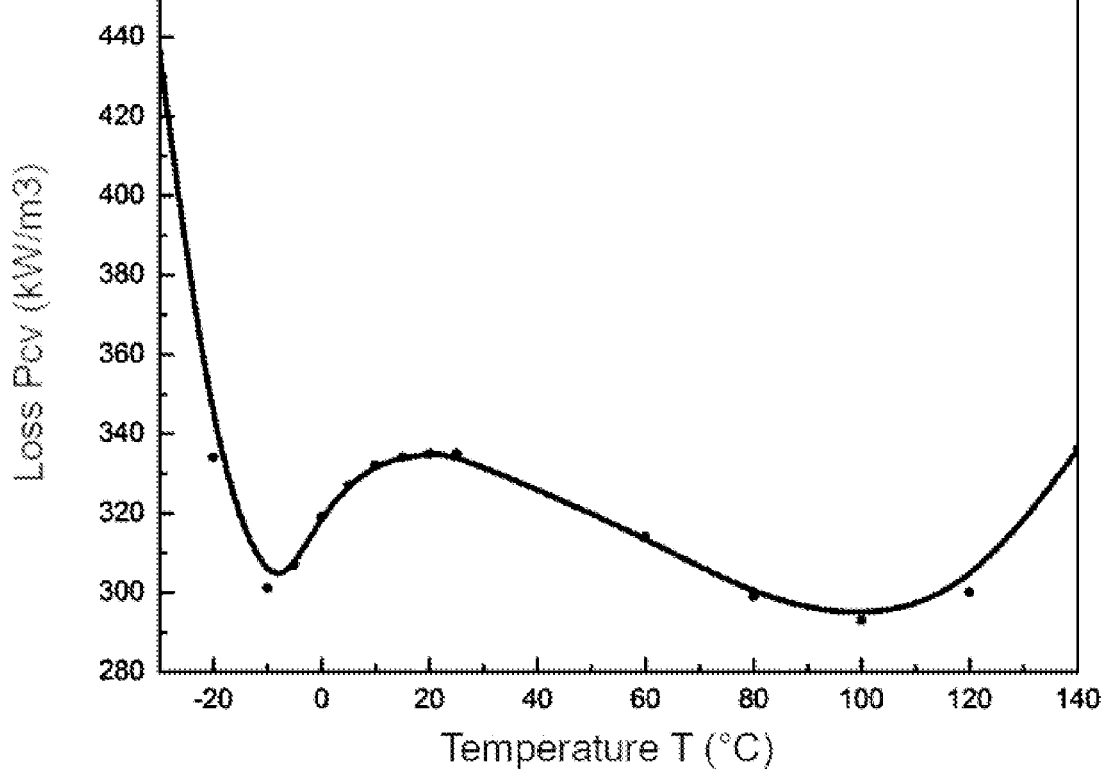

MANGANESE-ZINC FERRITE WITH HIGH MAGNETIC PERMEABILITY AT NEGATIVE TEMPERATURE AND LOW LOSS AT HIGH TEMPERATURE AND METHOD FOR PREPARING SAME

CROSS REFERENCE TO THE RELATED APPLICATIONS

This application is the national stage entry of International Application No. PCT/CN2020/101986, filed on Jul. 15, 2020, which is based upon and claims priority to Chinese Patent Application No. 202010101797.X, filed on Feb. 19, 2020, the entire contents of which are incorporated herein by reference.

TECHNICAL FIELD

The present invention relates to the technical field of manganese-zinc ferrites, and in particular to a manganese-zinc ferrite with a high magnetic permeability at negative temperature and low loss at high temperature and a method for preparing the same.

BACKGROUND

With development of the eras and progress of the society, more and more attention has been paid to energy conservation, emission reduction and efficiency improvement. Similarly, loss reduction has also become a hot research topic in the field of magnetic material application. In the prior art, it is known that some ferrite materials have low loss at only single points, and cannot meet the current requirements for energy conservation, emission reduction and efficiency improvement so far. Compared with other ferrite materials which have low loss in a wider temperature range, but has low loss only in a temperature range of 25-100° C. Similarly, some materials also have low loss only in a temperature range of 60-140° C. Some products manufactured by other manufacturers in China also have similar situations. However, these ferrite materials have low loss only in a high temperature range, and cannot have a high magnetic permeability in a low temperature range or even a subzero temperature range.

SUMMARY

In order to solve the problems above, the present invention provides a manganese-zinc ferrite material with both a high magnetic permeability at about −20° C. and low loss in a temperature range of 120-140° C. to meet the requirements for operation of electronic components in extremely harsh environments.

The present invention further discloses a method for preparing the manganese-zinc ferrite.

In order to achieve the objective above, the present invention adopts the following technical solutions.

A manganese-zinc ferrite with a high magnetic permeability at negative temperature and low loss at high temperature includes main materials consisting of the following raw materials by mole percent:

52.35-52.45 mol % of $Fe_2O_3$, 37.6-37.9 mol % of MnO and 9.65-10.05 mol % of ZnO.

Preferably, the manganese-zinc ferrite further includes additives consisting of the following raw materials by weight percent: in the additives, based on a total weight of a pre-sintered material (a powder obtained after the main materials are pre-sintered), 0.06-0.10 wt % of $CaCO_3$, 0.015-0.04 wt % of $ZrO_2$, 0.3-0.45 wt % of $Co_2O_3$ and 0.1-0.2 wt % of $SnO_2$.

Preferably, the additives are added after the main materials are mixed and sintered to obtain the pre-sintered material.

A method for preparing the manganese-zinc ferrite with a high magnetic permeability at negative temperature and low loss at high temperature includes the following steps:

(a) mixing various components in the main materials, and conducting primary ball milling to obtain a ball milled powder;

(b) adding a binder aqueous solution into the ball milled powder for uniform mixing, and conducting spray granulation and pre-sintering to obtain a pre-sintered material;

(c) adding the additives into the pre-sintered material, and conducting secondary ball milling to obtain a secondary ball milled powder; and (d) adding a binder aqueous solution into the secondary ball milled powder for uniform mixing, conducting spray granulation and compression molding to obtain a standard ring, and sintering the standard ring to obtain the manganese-zinc ferrite.

Preferably, the binder aqueous solution is a polyvinyl alcohol solution with a concentration of 7-8 wt %. In the primary ball milled powder, the binder aqueous solution is added at 8-12 wt % of a weight of the main materials. In the secondary ball milled powder, the binder aqueous solution is added at 8-12 wt % of a weight of the pre-sintered material.

Preferably, in step (a), deionized water is used in the primary ball milling, a weight ratio of the materials to a ball to the deionized water is 1:(5-7):(0.5-0.6), and the ball milling is conducted for 50-70 min.

Preferably, in step (c), deionized water is used in the secondary ball milling, a weight ratio of the materials to a ball to the deionized water is 1:(5-7):(0.4-0.5), and the ball milling is conducted for 120-160 min.

Preferably, in step (b), the pre-sintering is conducted at a temperature of 900-920° C.

Preferably, in step (d), the compression molding is conducted under a pressure of 7-9 MPa.

Preferably, in step (d), the sintering is conducted at a temperature of 1,280-1,320° C.

In the prior art, it is known that when the content of the $Co_2O_3$ is increased, the magnetic permeability at −20° C. is reduced, and loss reduction at 120-140° C. is not facilitated. The reason is that the high content of $Co_2O_3$ will shift the valley toward the low temperature direction.

In the present invention, it is known that the magnetic permeability at −20° C. is not necessarily related to the content of the $Co_2O_3$, and the magneto-crystalline anisotropy constant K1 of the material is the core factor affecting the magnetic permeability at −20° C. When the K1 is small, the magnetic permeability is high. When the K1 is large, the magnetic permeability is low. In addition, by appropriately increasing the content of the $Co_2O_3$, the loss reduction at 120-140° C. is facilitated. The present invention provides a method for increasing the magnetic permeability at −20° C. and reducing the loss at 120-140° C. by increasing the content of the $Co_2O_3$, which is completely different from the traditional perception that when the content of the $Co_2O_3$ is increased, the magnetic permeability at −20° C. is reduced, and the loss at 120-140° C. is increased.

As core innovations, the present invention can provide a manganese-zinc ferrite material with two valleys in a loss-temperature curve and a method for preparing the same.

Specifically, the valleys of the material are supposed to be fully used. When the valleys are determined, the magneto-crystalline anisotropy constant K1 at $-20°$ C., $120°$ C. and $140°$ C. is reduced by adding an appropriately high amount of $Co_2O_3$. Here, it is necessary to fully explain that the valley is different from that in the prior art. The valley in the prior art refers to the lowest loss in a range of $25-120°$ C. The valley in the present invention refers to both the valley in the prior art and the valley at about $-20°$ C.

Therefore, the present invention has the following beneficial effects. The present invention, by reasonably adjusting a ratio of Mn to Zn to Fe and appropriately increasing the content of Co in the additives, a manganese-zinc ferrite material with both a high magnetic permeability and low loss at about $-20°$ C. and low loss at $120-140°$ C. is obtained. The manganese-zinc ferrite material has two loss valleys at about $-20°$ C. and about $100°$ C. in a temperature range of $-30°$ C. to $140°$ C., which expands the application range of the manganese-zinc ferrite material.

BRIEF DESCRIPTION OF THE DRAWINGS

The FIGURE shows a loss Pcv curve of the manganese-zinc ferrite material obtained in Example 1 of the present invention in a temperature range of $-30°$ C. to $140°$ C.

DETAILED DESCRIPTION OF THE EMBODIMENTS

The technical solutions of the present invention are further described below in conjunction with specific embodiments.

Apparently, the described examples are merely a part, rather than all of examples of the present invention. Based on the examples of the present invention, all other examples obtained by those of ordinary skill in the art without creative efforts shall fall within the protection scope of the present invention.

In the present invention, unless otherwise specified, all equipment and raw materials may be purchased from the market or are commonly used in the industry. Unless otherwise specified, methods in the following examples are conventional methods in the field.

Example 1

A manganese-zinc ferrite with a high magnetic permeability at negative temperature and low loss at high temperature included main materials consisting of the following raw materials by mole percent:

52.35 mol % of $Fe_2O_3$, 37.6 mol % of MnO and 10.05 mol % of ZnO.

The manganese-zinc ferrite further included additives consisting of the following raw materials by weight percent: in the additives, based on a total weight of a pre-sintered material, 0.08 wt % of $CaCO_3$, 0.02 wt % of $ZrO_2$, 0.4 wt % of $Co_2O_3$ and 0.1 wt % of $SnO_2$.

A method for preparing the manganese-zinc ferrite with a high magnetic permeability at negative temperature and low loss at high temperature included the following steps:

(a) various components in the main materials were mixed, and primary ball milling was conducted for 60 min by using deionized water to obtain a ball milled powder, where, a weight ratio of the materials to a ball to the deionized water was 1:6:0.55;

(b) a binder aqueous solution was added into the ball milled powder for uniform mixing, spray granulation was conducted, and then pre-sintering was conducted at $900°$ C. to obtain a pre-sintered material, where, the binder aqueous solution was a polyvinyl alcohol solution with a concentration of 7.5 wt %, and was added at 10 wt % of the weight of the main materials;

(c) the additives were added into the pre-sintered material, and secondary ball milling was conducted for 120 min by using deionized water to obtain a secondary ball milled powder, where, a weight ratio of the materials to a ball to the deionized water was 1:6:0.45; and (d) a binder aqueous solution was added into the secondary ball milled powder for uniform mixing, spray granulation was conducted, compression molding was conducted under a pressure of 8 MPa to obtain a standard ring, and the standard ring was sintered at a temperature of $1,300°$ C. to obtain the manganese-zinc ferrite, where, the binder aqueous solution was a polyvinyl alcohol solution with a concentration of 7.5 wt %, and was added at 10 wt % of the weight of the pre-sintered material.

Example 2

A manganese-zinc ferrite with a high magnetic permeability at negative temperature and low loss at high temperature included main materials consisting of the following raw materials by mole percent:

52.45 mol % of $Fe_2O_3$, 37.9 mol % of MnO and 9.65 mol % of ZnO.

The manganese-zinc ferrite further included additives consisting of the following raw materials by weight percent: in the additives, based on a total weight of a pre-sintered material, 0.08 wt % of $CaCO_3$, 0.02 wt % of $ZrO_2$, 0.44 wt % of $Co_2O_3$ and 0.1 wt % of $SnO_2$.

A method for preparing the manganese-zinc ferrite with a high magnetic permeability at negative temperature and low loss at high temperature included the following steps:

(a) various components in the main materials were mixed, and primary ball milling was conducted for 60 min by using deionized water to obtain a ball milled powder, where, a weight ratio of the materials to a ball to the deionized water was 1:6:0.55;

(b) a binder aqueous solution was added into the ball milled powder for uniform mixing, spray granulation was conducted, and then pre-sintering was conducted at $920°$ C. to obtain a pre-sintered material, where, the binder aqueous solution was a polyvinyl alcohol solution with a concentration of 7.5 wt %, and was added at 10 wt % of the weight of the main materials;

(c) the additives were added into the pre-sintered material, and secondary ball milling was conducted for 140 min by using deionized water to obtain a secondary ball milled powder, where, a weight ratio of the materials to a ball to the deionized water was 1:6:0.45; and (d) a binder aqueous solution was added into the secondary ball milled powder for uniform mixing, spray granulation was conducted, compression molding was conducted under a pressure of 8 MPa to obtain a standard ring, and the standard ring was sintered at a temperature of $1,300°$ C. to obtain the manganese-zinc ferrite, where, the binder aqueous solution was a polyvinyl alcohol solution with a concentration of 7.5 wt %, and was added at 10 wt % of the weight of the pre-sintered material.

Example 3

A manganese-zinc ferrite with a high magnetic permeability at negative temperature and low loss at high temperature included main materials consisting of the following raw materials by mole percent:

52.45 mol % of $Fe_2O_3$, 37.8 mol % of MnO and 9.75 mol % of ZnO.

The manganese-zinc ferrite further included additives consisting of the following raw materials by weight percent: in the additives, based on a total weight of a pre-sintered material, 0.06 wt % of $CaCO_3$, 0.015 wt % of $ZrO_2$, 0.3 wt % of $Co_2O_3$ and 0.15 wt % of $SnO_2$.

A method for preparing the manganese-zinc ferrite with a high magnetic permeability at negative temperature and low loss at high temperature included the following steps:

(a) various components in the main materials were mixed, and primary ball milling was conducted for 70 min by using deionized water to obtain a ball milled powder, where, a weight ratio of the materials to a ball to the deionized water was 1:5:0.5;

(b) a binder aqueous solution was added into the ball milled powder for uniform mixing, spray granulation was conducted, and then pre-sintering was conducted at 910° C. to obtain a pre-sintered material, where, the binder aqueous solution was a polyvinyl alcohol solution with a concentration of 7 wt %, and was added at 12 wt % of the weight of the main materials;

(c) the additives were added into the pre-sintered material, and secondary ball milling was conducted for 160 min by using deionized water to obtain a secondary ball milled powder, where, a weight ratio of the materials to a ball to the deionized water was 1:5:0.4; and (d) a binder aqueous solution was added into the secondary ball milled powder for uniform mixing, spray granulation was conducted, compression molding was conducted under a pressure of 7 MPa to obtain a standard ring, and the standard ring was sintered at a temperature of 1,280° C. to obtain the manganese-zinc ferrite, where, the binder aqueous solution was a polyvinyl alcohol solution with a concentration of 7 wt %, and was added at 12 wt % of the weight of the pre-sintered material.

Example 4

A manganese-zinc ferrite with a high magnetic permeability at negative temperature and low loss at high temperature included main materials consisting of the following raw materials by mole percent:

52.43 mol % of $Fe_2O_3$, 37.65 mol % of MnO and 9.92 mol % of ZnO.

The manganese-zinc ferrite further included additives consisting of the following raw materials by weight percent: in the additives, based on a total weight of a pre-sintered material, 0.07 wt % of $CaCO_3$, 0.025 wt % of $ZrO_2$, 0.45 wt % of $Co_2O_3$ and 0.2 wt % of $SnO_2$.

A method for preparing the manganese-zinc ferrite with a high magnetic permeability at negative temperature and low loss at high temperature included the following steps:

(a) various components in the main materials were mixed, and primary ball milling was conducted for 50 min by using deionized water to obtain a ball milled powder, where, a weight ratio of the materials to a ball to the deionized water was 1:7:0.6;

(b) a binder aqueous solution was added into the ball milled powder for uniform mixing, spray granulation was conducted, and then pre-sintering was conducted at 920° C. to obtain a pre-sintered material, where, the binder aqueous solution was a polyvinyl alcohol solution with a concentration of 8 wt %, and was added at 8 wt % of the weight of the main materials;

(c) the additives were added into the pre-sintered material, and secondary ball milling was conducted for 120 min by using deionized water to obtain a secondary ball milled powder, where, a weight ratio of the materials to a ball to the deionized water was 1:7:0.5; and (d) a binder aqueous solution was added into the secondary ball milled powder for uniform mixing, spray granulation was conducted, compression molding was conducted under a pressure of 9 MPa to obtain a standard ring, and the standard ring was sintered at a temperature of 1,310° C. to obtain the manganese-zinc ferrite, where, the binder aqueous solution was a polyvinyl alcohol solution with a concentration of 8 wt %, and was added at 8 wt % of the weight of the pre-sintered material.

Example 5

A manganese-zinc ferrite with a high magnetic permeability at negative temperature and low loss at high temperature included main materials consisting of the following raw materials by mole percent:

52.40 mol % of $Fe_2O_3$, 37.90 mol % of MnO and 9.70 mol % of ZnO.

The manganese-zinc ferrite further included additives consisting of the following raw materials by weight percent: in the additives, based on a total weight of a pre-sintered material, 0.10 wt % of $CaCO_3$, 0.04 wt % of $ZrO_2$, 0.35 wt % of $Co_2O_3$ and 0.13 wt % of $SnO_2$.

A method for preparing the manganese-zinc ferrite with a high magnetic permeability at negative temperature and low loss at high temperature included the following steps:

(a) various components in the main materials were mixed, and primary ball milling was conducted for 60 min by using deionized water to obtain a ball milled powder, where, a weight ratio of the materials to a ball to the deionized water was 1:6:0.55;

(b) a binder aqueous solution was added into the ball milled powder for uniform mixing, spray granulation was conducted, and then pre-sintering was conducted at 910° C. to obtain a pre-sintered material, where, the binder aqueous solution was a polyvinyl alcohol solution with a concentration of 7.5 wt %, and was added at 10 wt % of the weight of the main materials;

(c) the additives were added into the pre-sintered material, and secondary ball milling was conducted for 140 min by using deionized water to obtain a secondary ball milled powder, where, a weight ratio of the materials to a ball to the deionized water was 1:6:0.45; and (d) a binder aqueous solution was added into the secondary ball milled powder for uniform mixing, spray granulation was conducted, compression molding was conducted under a pressure of 8 MPa to obtain a standard ring, and the standard ring was sintered at a temperature of 1,300° C. to obtain the manganese-zinc ferrite, where, the binder aqueous solution was a polyvinyl alcohol solution with a concentration of 7.5 wt %, and was added at 10 wt % of the weight of the pre-sintered material.

Example 6

A manganese-zinc ferrite with a high magnetic permeability at negative temperature and low loss at high temperature included main materials consisting of the following raw materials by mole percent:

52.38 mol % of $Fe_2O_3$, 37.85 mol % of MnO and 9.77 mol % of ZnO.

The manganese-zinc ferrite further included additives consisting of the following raw materials by weight percent: in the additives, based on a total weight of a pre-sintered material, 0.09 wt % of $CaCO_3$, 0.03 wt % of $ZrO_2$, 0.39 wt % of $Co_2O_3$ and 0.18 wt % of $SnO_2$.

A method for preparing the manganese-zinc ferrite with a high magnetic permeability at negative temperature and low loss at high temperature included the following steps:

(a) various components in the main materials were mixed, and primary ball milling was conducted for 60 min by using deionized water to obtain a ball milled powder, where, a weight ratio of the materials to a ball to the deionized water was 1:6:0.55;

(b) a binder aqueous solution was added into the ball milled powder for uniform mixing, spray granulation was conducted, and then pre-sintering was conducted at 900° C. to obtain a pre-sintered material, where, the binder aqueous solution was a polyvinyl alcohol solution with a concentration of 7.5 wt %, and was added at 10 wt % of the weight of the main materials;

(c) the additives were added into the pre-sintered material, and secondary ball milling was conducted for 150 min by using deionized water to obtain a secondary ball milled powder, where, a weight ratio of the materials to a ball to the deionized water was 1:6:0.45; and (d) a binder aqueous solution was added into the secondary ball milled powder for uniform mixing, spray granulation was conducted, compression molding was conducted under a pressure of 8 MPa to obtain a standard ring, and the standard ring was sintered at a temperature of 1,300° C. to obtain the manganese-zinc ferrite, where, the binder aqueous solution was a polyvinyl alcohol solution with a concentration of 7.5 wt %, and was added at 10 wt % of the weight of the pre-sintered material.

Comparative Example 1

A manganese-zinc ferrite included main materials consisting of the following raw materials by mole percent:

52.75 mol % of $Fe_2O_3$, 37.2 mol % of MnO and 10.05 mol % of ZnO.

In this comparative example, additives of the manganese-zinc ferrite and a method for preparing the manganese-zinc ferrite were the same with those in Example 1.

Comparative Example 2

A manganese-zinc ferrite included main materials consisting of the following raw materials by mole percent:

52.25 mol % of $Fe_2O_3$, 38.00 mol % of MnO and 9.75 mol % of ZnO.

In this comparative example, additives of the manganese-zinc ferrite and a method for preparing the manganese-zinc ferrite were the same with those in Example 1.

Comparative Example 3

A manganese-zinc ferrite included main materials consisting of the following raw materials by mole percent:

52.44 mol % of $Fe_2O_3$, 37.96 mol % of MnO and 9.60 mol % of ZnO.

In this comparative example, additives of the manganese-zinc ferrite and a method for preparing the manganese-zinc ferrite were the same with those in Example 1.

Comparative Example 4

A manganese-zinc ferrite included main materials consisting of the following raw materials by mole percent:

52.35 mol % of $Fe_2O_3$, 37.55 mol % of MnO and 10.10 mol % of ZnO.

In this comparative example, additives of the manganese-zinc ferrite and a method for preparing the manganese-zinc ferrite were the same with those in Example 1.

Comparative Example 5

A manganese-zinc ferrite included main materials consisting of the following raw materials by mole percent:

52.25 mol % of $Fe_2O_3$, 37.75 mol % of MnO and 10.00 mol % of ZnO.

In this comparative example, additives of the manganese-zinc ferrite and a method for preparing the manganese-zinc ferrite were the same with those in Example 1.

Comparative Example 6

A manganese-zinc ferrite included main materials consisting of the following raw materials by mole percent:

52.55 mol % of $Fe_2O_3$, 37.70 mol % of MnO and 9.75 mol % of ZnO.

In this comparative example, additives of the manganese-zinc ferrite and a method for preparing the manganese-zinc ferrite were the same with those in Example 1.

Comparative Example 7

Main materials of a manganese-zinc ferrite and a method for preparing the manganese-zinc ferrite were the same with those in Example 1.

The manganese-zinc ferrite included following additives by weight percent:

based on a total weight of a pre-sintered material, 0.08 wt % of $CaCO_3$, 0.02 wt % of $ZrO_2$, 0.20 wt % of $Co_2O_3$ and 0.1 wt % of $SnO_2$.

Comparative Example 8

Main materials of a manganese-zinc ferrite and a method for preparing the manganese-zinc ferrite were the same with those in Example 1.

The manganese-zinc ferrite included following additives by weight percent:

based on a total weight of a pre-sintered material, 0.08 wt % of $CaCO_3$, 0.02 wt % of $ZrO_2$, 0.50 wt % of $Co_2O_3$ and 0.1 wt % of $SnO_2$.

Performance Testing:

Performance of the manganese-zinc ferrite materials obtained in each of the examples and comparative examples above was tested, including the magnetic permeability $\mu i$ at −20° C. and the loss Pcv at 120° C. and 140° C. (100 kHz 200 mT), as shown in the Table 1 below.

A loss Pcv curve of the manganese-zinc ferrite material obtained in Example 1 in a temperature range of −30° C. to 140° C. was drawn according to actual conditions, as shown in the FIGURE.

TABLE 1

| | Magnetic permeability μi | Loss Pcv (kW/m³) 100 kHz 200 mT | |
| | −20° C. | 120° C. | 140° C. |
| --- | --- | --- | --- |
| Example 1 | 2,800 | 300 | 336 |
| Example 2 | 2,680 | 313 | 345 |
| Example 3 | 2,720 | 315 | 345 |
| Example 4 | 2,760 | 310 | 340 |
| Example 5 | 2,710 | 305 | 335 |
| Example 6 | 2,695 | 310 | 343 |
| Comparative Example 1 | 1,500 | 450 | 520 |
| Comparative Example 2 | 1,700 | 430 | 530 |
| Comparative Example 3 | 1,450 | 445 | 530 |
| Comparative Example 4 | 1,200 | 450 | 540 |
| Comparative Example 5 | 1,520 | 480 | 560 |
| Comparative Example 6 | 1,487 | 450 | 510 |
| Comparative Example 7 | 1,700 | 420 | 480 |
| Comparative Example 8 | 1,100 | 410 | 470 |

From Table 1, following information could be known.

1. In Comparative Example 1, since the content of the $Fe_2O_3$ was too high and the content of the MnO was low, the loss at high temperature was high, and the magnetic permeability at −20° C. was much lower than that of the samples in the examples.

2. In Comparative Example 2, since the content of the $Fe_2O_3$ was low and the content of the MnO was too high, the loss at high temperature was high, and the magnetic permeability at −20° C. was much lower than that of the samples in the examples but slightly higher than that of the sample in Comparative Example 1.

3. In Comparative Example 3, since the content of the MnO was too high and the content of the ZnO was low, the loss at high temperature was high, and the magnetic permeability at −20° C. was much lower than that of the samples in the examples.

4. In Comparative Example 4, since the content of the MnO was low and the content of the ZnO was too high, the loss at high temperature was high, and the magnetic permeability at −20° C. was much lower than that of the samples in the examples and lower than that of the sample in Comparative Example 3.

5. In Comparative Example 5, since the content of the $Fe_2O_3$ was low, the loss at high temperature was much higher than that of the samples in the examples, and the magnetic permeability at −20° C. was low.

6. In Comparative Example 6, since the content of the $Fe_2O_3$ was too high, the loss at high temperature was much higher than that of the samples in the examples, and the magnetic permeability at −20° C. was low and even lower than that of the sample in Comparative Example 5.

7. In Comparative Example 7, since the content of the $Co_2O_3$ was low, the loss at high temperature was high, and the magnetic permeability at −20° C. was low.

8. In Comparative Example 8, since the content of the $Co_2O_3$ was too high, the loss at high temperature was high, and the magnetic permeability at −20° C. was greatly reduced and even lower than that of the sample in Comparative Example 7.

It should be understood that improvements and modifications may be made by those of ordinary skill in the art based on the descriptions above, and all these improvements and modifications shall fall within the protection scope of the appended claims of the present invention.

What is claimed is:

1. A manganese-zinc ferrite with a high magnetic permeability at negative temperature and low loss at high temperature, comprising main materials consisting of the following raw materials by mole percent:

52.35-52.45 mol % of $Fe_2O_3$, 37.6-37.97 mol % of MnO and 9.65-10.05 mol % of ZnO, and additives consisting of the following raw materials by weight percent:

in the additives, based on a total weight of the main materials, 0.06-0.10 wt % of $CaCO_3$, 0.015-0.04 wt % of $ZrO_2$, 0.3-0.45 wt % of $Co_2O_3$ and 0.1-0.2 wt % of $SnO_2$.

2. The manganese-zinc ferrite according to claim 1, wherein, the additives are added after the main materials are mixed and sintered to obtain a pre-sintered material.

3. A method for preparing the manganese-zinc ferrite according to claim 1, comprising the following steps:

(a) mixing various components in the main materials, and conducting primary-sanding ball milling to obtain a primary ball milled powder-sanded slurry;

(b) adding a first binder aqueous solution into the primary ball milled powder for uniform mixing, and conducting spray granulation and pre-sintering to obtain a pre-sintered material;

(c) adding the additives into the pre-sintered material, and conducting secondary ball milling to obtain a secondary ball milled powder; and (d) adding a second binder aqueous solution into the secondary ball milled powder for uniform mixing, conducting spray granulation and compression molding to obtain a ring, and sintering the ring to obtain the manganese-zinc ferrite.

4. The method according to claim 3, wherein, each of the first binder aqueous solution and the second binder aqueous solution is a polyvinyl alcohol solution with a concentration of 7-8 wt %, and the first binder aqueous solution is added at 8-12 wt % of a weight of the primary ball milled powder and the second binder aqueous solution is added at 8-12 wt % of the weight of the secondary ball milled powder.

5. The method according to claim 3, wherein, in step (a), deionized water is used in the primary ball milling to obtain the primary ball milled powder, a weight ratio of the main materials to a ball to the deionized water is 1:(5-7):(0.5-0.6), and the primary ball milling is conducted for 50-70 min.

6. The method according to claim 3, wherein, in step (c), deionized water is used in the secondary ball milling to obtain the secondary ball milled powder, a weight ratio of the main materials to a ball to the deionized water is 1:(5-7):(0.4-0.5), and the secondary ball milling is conducted for 50-120 min.

7. The method according to claim 3, wherein, in step (b), the pre-sintering is conducted at a temperature of 900-920° C.

8. The method according to claim 3, wherein, in step (d), the compression molding is conducted under a pressure of 7-9 MPa.

9. The method according to claim 3, wherein,
in step (d), the sintering is conducted at a temperature of
1,280-1,320° C.

\* \* \* \* \*